US012651881B2

(12) United States Patent
Lu et al.

(10) Patent No.: US 12,651,881 B2
(45) Date of Patent: Jun. 9, 2026

(54) ALL-SOLID-STATE SINGLE-FREQUENCY CONTINUOUS WAVE LASER

(71) Applicant: Shanxi University, Taiyuan (CN)

(72) Inventors: Huadong Lu, Taiyuan (CN); Yixiao Wei, Taiyuan (CN); Jing Su, Taiyuan (CN); Kunchi Peng, Taiyuan (CN)

(73) Assignee: Shanxi University, Shanxi Province (CN)

( * ) Notice: Subject to any disclaimer, the term of this patent is extended or adjusted under 35 U.S.C. 154(b) by 539 days.

(21) Appl. No.: 18/235,804

(22) Filed: Aug. 18, 2023

(65) Prior Publication Data

US 2024/0120701 A1 Apr. 11, 2024

(30) Foreign Application Priority Data

Oct. 11, 2022 (CN) .......................... 202211243135.1

(51) Int. Cl.
| | |
|---|---|
| *H01S 3/08* | (2023.01) |
| *H01S 3/07* | (2006.01) |
| *H01S 3/083* | (2006.01) |
| *H01S 3/0941* | (2006.01) |
| *H01S 3/108* | (2006.01) |

(52) U.S. Cl.
CPC ............ *H01S 3/08072* (2013.01); *H01S 3/07* (2013.01); *H01S 3/083* (2013.01); *H01S 3/0941* (2013.01); *H01S 3/108* (2013.01)

(58) Field of Classification Search
CPC ......... H01S 3/07; H01S 3/083; H01S 3/08072
See application file for complete search history.

(56) References Cited

U.S. PATENT DOCUMENTS

| | | | | |
|---|---|---|---|---|
| 5,930,283 A | * | 7/1999 | Imai ........................ | H01S 3/083 |
| | | | | 372/75 |
| 8,000,372 B1 | * | 8/2011 | Austin .................. | H01S 3/1066 |
| | | | | 372/99 |
| 2004/0179559 A1 | * | 9/2004 | Butterworth ............ | H01S 5/141 |
| | | | | 372/21 |

(Continued)

FOREIGN PATENT DOCUMENTS

| | | | | | |
|---|---|---|---|---|---|
| CN | 109586150 A | * | 4/2019 | ............... | H01S 3/16 |
| DE | 4141052 A1 | * | 6/1993 | ......... | H01S 3/09415 |
| DE | 4228541 C1 | * | 1/1994 | ............. | H01S 3/083 |

*Primary Examiner* — James A Menefee
(74) *Attorney, Agent, or Firm* — Weber Rosselli & Cannon LLP

(57) ABSTRACT

An all-solid-state single-frequency continuous wave laser is provided, which includes a symmetric ring resonant cavity, a first gain crystal and a second gain crystal symmetrically arranged in the symmetric ring resonant cavity, and a gain unit symmetrically arranged between the first gain crystal and the second gain crystal. The gain unit includes at least one gain crystal arranged in sequence. In the gain unit, a third gain crystal nearest to the first gain crystal and a fourth gain crystal nearest to the second gain crystal are symmetrically arranged. Each gain crystal is coupled with a separate pump source. Each gain crystal in the symmetric ring resonant cavity is equipped with a separate pump source, and the imaging system is eliminated in the symmetric ring resonant cavity. On the premise that the pump power is not limited, the laser can achieve stable single-frequency operation in a wide pump range.

10 Claims, 6 Drawing Sheets

(56)　　　　　　References Cited

U.S. PATENT DOCUMENTS

| 2010/0027571 | A1* | 2/2010 | Murdoch | ................ H01S 3/109 |
| | | | | 372/21 |
| 2015/0071321 | A1* | 3/2015 | Moshchansky-Livingston | ........... |
| | | | | H01S 5/02326 |
| | | | | 372/94 |
| 2019/0089119 | A1* | 3/2019 | Lu | ....................... H01S 3/08031 |
| 2021/0164850 | A1* | 6/2021 | Su | ....................... H01S 3/08072 |

* cited by examiner

ALL-SOLID-STATE SINGLE-FREQUENCY CONTINUOUS WAVE LASER

CROSS REFERENCE TO RELATED APPLICATION

This patent application claims the benefit of and priority to Chinese Patent Application No. 2022112431351, filed with the Chinese National Intellectual Property Administration on Oct. 11, 2022, the disclosure of which is incorporated by reference herein in its entirety as part of the present application.

TECHNICAL FIELD

The present disclosure relates to the technical field of the laser, and particularly to an all-solid-state single-frequency continuous wave laser.

BACKGROUND

All-solid-state continuous-wave high power single frequency lasers with excellent beam quality, high power stability, narrow linewidth and low noise have profound impacts in a variety of researches and applications including quantum optics and quantum information, atom physics, high precision measurement and so on. As basic pump sources, the lasers have been used for the wavelength extension and the preparation of non-classical light field under the assistance of nonlinear frequency conversion process such as frequency doubling, sum frequency, difference frequency, optical parametric oscillation, and Raman. With rapidly development of science and technology, it is greatly needed to scale up the output power of an all-solid-state continuous-wave single-frequency laser and at the same time to maintain high quality of its output light beam. For example, in the application of laser interferometer gravitational-wave observatory (LIGO), the output power of the all-solid-state single-frequency continuous wave laser injected into the LIGO device should reach up-to 200 W to improve detection sensitivity of the device by 10 times relative to the initial LIGO with 10 W injected laser.

At present, scaling up the output power of the single-frequency continuous wave laser mainly be implemented by means of laser amplification technologies, such as fiber amplifier, slab amplifier, thin disk amplifier, bulk or rod crystal amplifier and single crystal fiber amplifier. Although laser amplification technology is an effective method to obtain high power single-frequency laser, in the process the noise of the laser is also synchronously amplified. However, single-frequency continuous wave lasers with both high output power and low noise are emergently needed in lots of applications including quantum optics and precision measurement. It is wanted to build a compact single-frequency laser of high power and low noise by increasing incident pump power without additional amplification system.

However, it is well known that severe thermal lens effect of the laser crystal will generate with the increase of the incident pump power, which will rapidly narrow the stability region of the laser, destroy the mode matching between the pump and laser modes which causes the fierce mode competition, and result in destructive crystal fracture under severe cases.

In order to overcome these issues aroused by gain crystals and achieve high-power laser output, it is generally necessary to insert multiple gain media in the resonant cavity. And in order to achieve mode self-reproduction between crystals, an imaging system composed of two plano-convex lenses with the same focal length is required between each two gain crystals.

However, due to the fixed focal lengths of the two plano-convex lenses, the stability region of the resonant cavity is quite narrow and the laser only will be operated at a given incident pump power, thus the further improvement of the output power is restricted. Moreover, for realizing the higher power and stable single-longitudinal-mode operation in this laser, the optical length between the imaging lenses have to be precisely adjusted, which increases the difficulty of the laser debugging.

SUMMARY

An all-solid-state single-frequency continuous wave laser is provided, where each gain crystal in a symmetric ring resonant cavity is equipped with a separate pump source, which reduces the adverse effect of the thermal lens effect of each gain crystal on the stable region of the resonant cavity, and enables the stable region in the resonant cavity relatively wide. In addition, an imaging system is eliminated in the symmetric ring resonant cavity, and a mode-matching is achieved by utilizing the inherent thermal lens properties of the gain crystal. The symmetrical arrangement of the resonant cavity achieves the mode self-reproduction between a first gain crystal and a second gain crystal with the farthest distance therebetween. On the premise that the pump power is not limited, the laser can achieve stable single-frequency operation in a wide pump range.

An all-solid-state single-frequency continuous wave laser is provided, which includes a symmetric ring resonant cavity, a first gain crystal and a second gain crystal symmetrically arranged in the symmetric ring resonant cavity, and a gain unit symmetrically arranged between the first gain crystal and the second gain crystal.

The symmetric ring resonant cavity includes an output cavity mirror and a first cavity mirror symmetrical with the output cavity mirror, and a second cavity mirror at a front end of the first gain crystal, the output cavity mirror, the first cavity mirror and a third cavity mirror at a front end of the second gain crystal form a 8-shaped optical path.

The gain unit includes at least one gain crystal arranged in sequence, and in the gain unit a third gain crystal nearest to the first gain crystal and a fourth gain crystal nearest to the second gain crystal are symmetrically arranged.

Each gain crystal is coupled with a separate pump source, an optical diode is arranged between the second cavity mirror and the output cavity mirror, and a nonlinear crystal is arranged at a beam waist between the first cavity mirror and the output cavity mirror.

Two gain crystals symmetrically arranged are the same, and each gain crystal is a gain medium and a mode-matching element.

In some embodiments, the third gain crystal and the fourth gain crystal may be the same crystal.

In some embodiments, the gain unit may include the third gain crystal, the fourth gain crystal, and at least one fifth gain crystal symmetrically arranged between the third gain crystal and the fourth gain crystal.

In some embodiments, the pump source may be a fiber coupled laser diode.

In some embodiments, the second cavity mirror and the third cavity mirror are concave-convex mirrors with an incidence angle of 10 degrees.

In some embodiments, a first number of plane mirrors with an incidence angle of 45 degrees may be arranged between the first gain crystal and the third gain crystal, and between the second gain crystal and the fourth gain crystal.

In some embodiments, the output cavity mirror and the first cavity mirror may be plano-concave mirrors with an incidence angle of 10 degrees, a flat face of the first cavity mirror may be coated with a high-transmittance film of fundamental frequency light and a high-transmittance film of frequency-doubled light, a concave face may be coated with a high-reflection film of fundamental frequency light and the high-transmittance film of frequency-doubled light, a flat face of the output cavity mirror may be coated with the high-transmittance film of fundamental frequency light and the high-transmittance film of frequency-doubled light, and a concave face may be coated with the high-transmittance film of frequency-doubled light and a transmission film with a predetermined transmissivity for a fundamental frequency light.

In some embodiments, for a different power combination of the pump sources for the gain crystals in the symmetric ring resonant cavity, the output power of the all-solid-state single-frequency continuous wave laser is different.

In some embodiments, for the resonant cavity a pump method of end pump or side pump may be adopted.

In some embodiments, the gain medium in the symmetric ring resonant cavity may include one or more of a slab gain medium, a bulk gain medium, a rod gain medium and a single crystal optical fiber gain medium.

Other features and advantages of the present disclosure will become clear from the following detailed description of exemplary embodiments of the present disclosure with reference to accompanying drawings.

BRIEF DESCRIPTION OF THE DRAWINGS

The accompanying drawings incorporated in the specification and constituting a part of the specification illustrate embodiments of the present disclosure, and together with its description, are used to explain the principles of the disclosure.

DETAILED DESCRIPTION OF THE EMBODIMENTS

Figure 1:
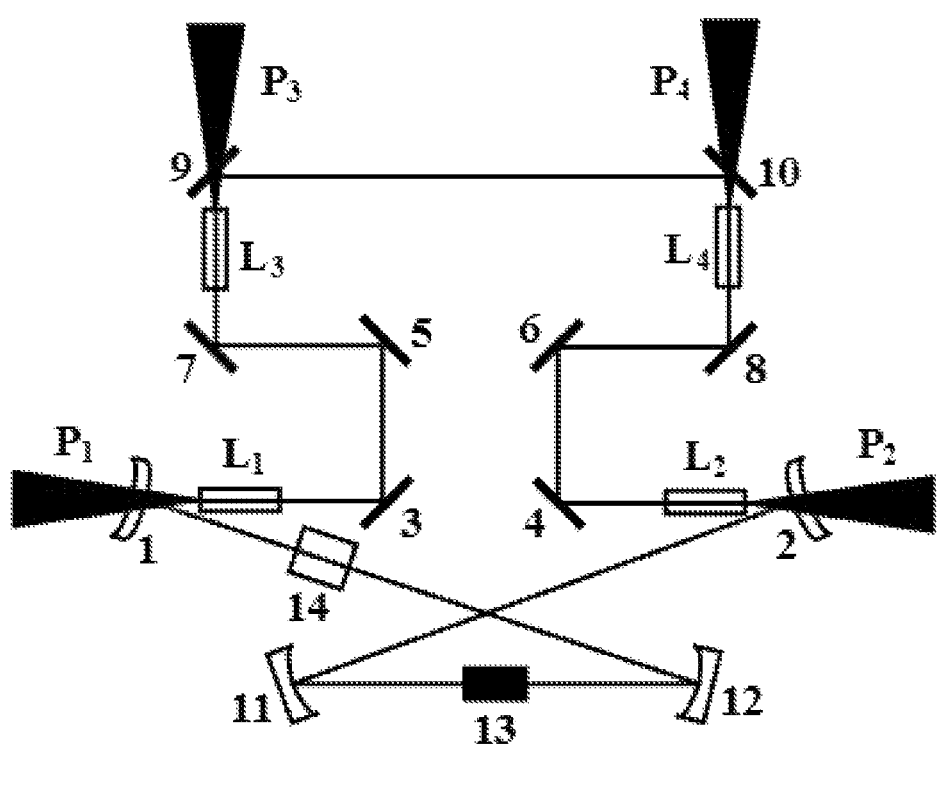
FIG. 1 shows a structural schematic view of a first embodiment of an all-solid-state single-frequency continuous wave laser according to the disclosure.

Various exemplary embodiments of the present disclosure will now be described in detail with reference to the accompanying drawings. It should be noted that unless otherwise specified, the relative arrangement of components and steps, numerical expressions and values set forth in the embodiments do not restrict the scope of the application.

The following description of at least one exemplary embodiment is merely illustrative in fact, and is in no way intended to limit the present application and its application or use.

The techniques, methods and devices known to those skilled in the art are not discussed in detail, but should be deemed as a part of the description when pertinent.

In all examples illustrated and discussed herein, any specific value shall be interpreted as only illustrative and not limiting. Thus, different values may exist for other examples of the exemplary embodiments.

An all-solid-state single-frequency continuous wave laser is provided, and each gain crystal in a symmetric ring resonant cavity is equipped separately with a pump source. Although the total incident pump power in the resonant cavity is very high, it is distributed to multiple gain crystals. On the one hand, the thermal lens effect and damage risk of each gain crystal are alleviated; and on the other hand, for a specific laser output power, appropriate pump power can be injected into each gain crystal, thus the adverse effect of the thermal lens effect of each gain crystal on the stable region of the resonant cavity is reduced, and the stable region of the resonant cavity is relatively wide. And in the symmetric ring resonant cavity, the imaging system is eliminated, and the cavity mode is changed by utilizing the inherent thermal lens properties of the gain crystal so as to achieve mode-matching. The symmetric arrangement of the resonant cavity achieves mode self-reproduction between a first gain crystal and a second gain crystal with a farthest distance therebetween. Moreover, since there is no imaging system with a fixed focal length, the pump power is not limited, thus the laser can achieve stable single-frequency operation in a wide pump range.

The all-solid-state single-frequency continuous wave laser according to the disclosure includes a symmetric ring resonant cavity, a first gain crystal and a second gain crystal arranged symmetrically in the symmetric ring resonant cavity, and a gain unit arranged symmetrically between the first gain crystal and the second gain crystal. The symmetric ring resonant cavity includes an output cavity mirror and a first cavity mirror symmetrically arranged with respect to the output cavity mirror, and a second cavity mirror at the front end of the first gain crystal (pump incident end), the output cavity mirror, the first cavity mirror, a third cavity mirror at the front end of the second gain crystal (pump incident end) form a 8-shaped optical path.

The gain unit is arranged outside the 8-shaped optical path, and includes at least one gain crystal sequentially arranged. In the gain unit, a third gain crystal closest to the first gain crystal and a fourth gain crystal closest to the second gain crystal are symmetrically arranged.

Two gain crystals in symmetrical positions are identical, and each gain crystal is both a gain medium and a mode-matching element with variable focal length. Each gain crystal (including the first gain crystal, the second gain crystal, and all gain crystals in the gain unit) is coupled with an independent pump source.

An optical diode is arranged between the second cavity mirror and the output cavity mirror, to effectively eliminate the spatial hole burning effect and force the laser to achieve stable unidirectional operation. A nonlinear crystal is arranged at the beam waist between the first cavity mirror and the output cavity mirror, so that the introduced nonlinear loss is sufficient to suppress multimode oscillation and mode hopping of the laser, and to achieve stable single-frequency operation of the laser.

It should be noted that the imaging system between two gain crystals is eliminated in the all-solid-state single-frequency continuous wave laser of the present disclosure. Therefore, the pump power injected into the gain crystal is not limited, and the laser can achieve stable single-frequency operation in a wide pump range.

Embodiment 1

FIG. 1 shows a structure schematic view of the first embodiment of the present disclosure. As shown in FIG. 1, in a symmetric ring resonant cavity, an output cavity mirror 12 is arranged symmetrically with respect to a first cavity mirror 11. An optical diode 14 is arranged between a second cavity mirror 1 and the output cavity mirror 12, and is configured to allow light to be transmitted from the second cavity mirror 1 to the output cavity mirror 12. A nonlinear crystal 13 is arranged at the beam waist between the first cavity mirror 11 and the output cavity mirror 12, and the second cavity mirror 1, the output cavity mirror 12, the first cavity mirror 11 and the third cavity mirror 2 form a 8-shaped optical path.

A second cavity mirror 1 is arranged at a front end (pump incident end) of a first gain crystal $L_1$, and the first gain crystal $L_1$ is coupled with a first pump source $P_1$. The third cavity mirror 2 is arranged at a front end (pump incident end) of a second gain crystal $L_2$, and the second gain crystal $L_2$ is coupled with a second pump source Pa. The first gain crystal $L_1$ and the second gain crystal $L_2$ are symmetrically arranged.

In the embodiment, a gain unit includes a third gain crystal $L_3$ and a fourth gain crystal $L_4$, which are coupled with a third pump source $P_3$ and a fourth pump source $P_4$, respectively. As shown in FIG. 1, cavity mirrors 3, 5, 7 for changing the optical path are arranged between the first gain crystal $L_1$ and the third gain crystal $L_3$, and cavity mirrors 4, 6, 8 for changing the optical path are arranged between the second gain crystal $L_2$ and the fourth gain crystal $L_4$. The optical path between the third gain crystal $L_3$ and the first gain crystal $L_1$ and the optical path between the fourth gain crystal $L_4$ and the second gain crystal $L_2$ are symmetrical. The optical path between the third gain crystal $L_3$ and the fourth gain crystal $L_4$ is changed by cavity mirrors 9 and 10.

As an embodiment, the above pump sources are laser diodes coupled with optical fiber.

As another embodiment, the resonant cavity adopts a pumping method of end pumping, which makes it easier to achieve accurate mode-matching, and obtain high beam quality and high-power laser output.

As an embodiment, the second cavity mirror 1 and the third cavity mirror 2 are concave-convex lens with an incidence angle of 10 degrees, and their pump incidence end faces each are coated with a high transmission film for pump light, and the other end faces each are coated with the high transmission film for pump light and a high reflection film for fundamental frequency light. The cavity mirror 9 and the cavity mirror 10 are plane mirrors with an incidence angle of 45 degrees, and their pump incidence end faces each are coated with the high transmission film for pump light, and the other end face each are coated with the high transmission film for pump light and the high reflection film for fundamental frequency light. The cavity mirrors 3, 5, 7, 4, 6, 8 are plane mirrors with an incidence angle of 45 degrees, and their reflection faces each are coated with the high reflection film for fundamental frequency light. The first cavity mirror 11 and the output cavity mirror 12 are plano-concave lens with an incidence angle of 10 degrees. A flat face of the first cavity mirror 11 is coated with the high transmission film for fundamental frequency light and the high transmission film for frequency-doubled light, and a concave face is coated with the high reflection film for fundamental frequency light and high transmission film for frequency-doubled light. A flat face of the output cavity mirror 12 is coated with the high transmission film for fundamental frequency light and the high transmission film for frequency-doubled light, and a concave face is coated with the high transmission film for frequency-doubled light and a transmission film with a predetermined transmissivity for the fundamental frequency light.

As an embodiment, the nonlinear crystal 13 may adopt temperature phase-matching or angle phase-matching. The material of the nonlinear crystal 13 is not limited herein.

As an embodiment, the above gain crystals are solid-state gain medium, which can be one or more of a slab gain medium, a bulk gain medium, a rod gain medium and a single crystal optical fiber gain medium.

As an embodiment, in order to precisely control the temperatures of laser crystals, each of them is closely wrapped with an indium foil and enclosed by water-cooled copper blocks adhered with a thermoelectric cooler (TEC) for heat dissipation. As another embodiment, the gain crystal can also be directly cooled by water.

Preferably, a certain wedge is cutting at the output end face of the gain crystal, which acts as a polarization beam splitter to facilitate the maintenance of stability of the laser polarization state.

Figure 2:
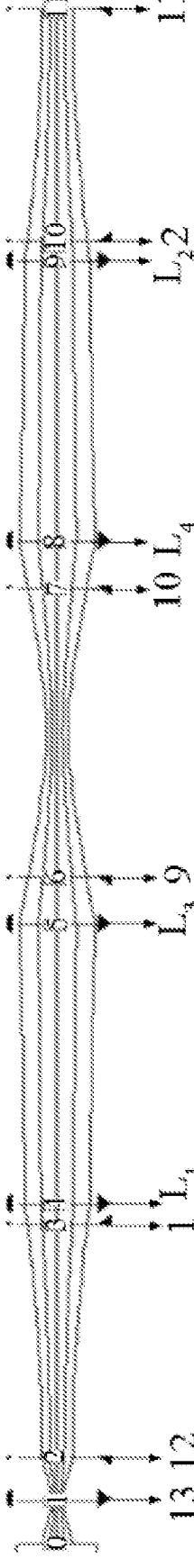
FIG. 2 shows a beam change trend graph of the embodiment shown in FIG. 1.

Each gain crystal is equipped separately with a pump source, thus although the total incident pump power in the resonant cavity is very high, it is distributed to multiple gain crystals. Thus, on the one hand, the thermal lens effect and damage risk of each gain crystal are alleviated, and on the other hand, for a specific laser output power, appropriate pump power can be injected into each gain crystal, thus reducing the adverse effect of the thermal lens effect of each gain crystal on the stable region of the resonant cavity, and the stable region of the resonant cavity is relatively wide. On this basis, due to thermal lens property of the gain crystal itself, the gain crystal can be used as a lens to assist in mode-matching, as shown in FIG. 2. Furthermore, due to the elimination of the imaging system, the pump power injected into the gain crystal is not limited, and the focal length of the gain crystal changes with a change of the pump power, thus the gain crystal may act as a mode matching element with a variable focal length.

On the basis, by changing the pump power injected into each crystal, on the one hand, a good mode-matching between the pump mode and the cavity mode at each gain crystal can be achieved, and on the other hand, a dynamic self-mode-matching of the symmetric ring resonant cavity can be achieved by a dynamic change of each gain crystal, thus ensuring the high-power output mode to be $TEM_{00}$ mode, as described in detail below.

FIG. 3A-F shows that the beam waist radius of each gain crystal and the stable region of the symmetric ring resonant cavity in the embodiment of FIG. 1 change with the change of the incident pump power, where the pump power is a conversion result based on the thermal lens formula.

Due to the symmetric characteristic of the ring resonant cavity, the beam waist radius at the first gain crystal $L_1$ and the beam waist radius at the second gain crystal $L_2$ are equal, and the beam waist radius at the third gain crystal $L_3$ and the beam waist radius at the fourth gain crystal $L_4$ are equal. The incident pump power for the first gain crystal $L_1$ and the incident pump power for the second gain crystal $L_2$ change synchronously, and the incident pump power of the third gain crystal $L_3$ and the incident pump power of the fourth gain crystal $L_4$ change synchronously.

Figures 3A, 3B, 3C, 3D, 3E, 3F:
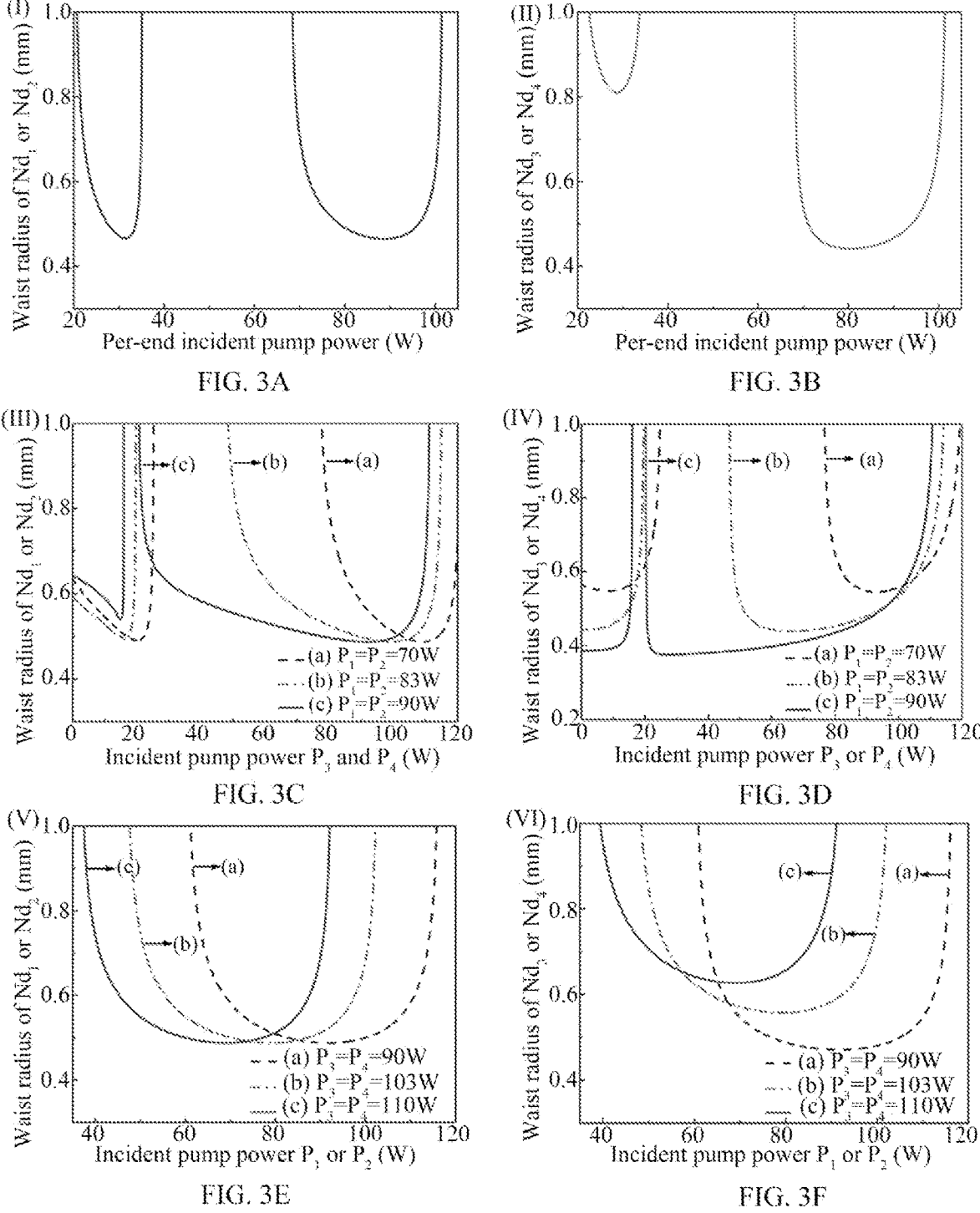
FIG. 3A-F shows changes of the beam waist radius of each gain crystal and the stable region of a symmetric ring resonant cavity with change of incident pump power in the embodiment shown in FIG. 1.

FIG. 3A (showing $L_1$ and $L_2$) and FIG. 3B (showing $L_3$ and $L_4$) show that the pump sources $P_1$-$P_4$ simultaneously increase. FIG. 3A shows that the beam waist radius at the first gain crystal $L_1$ and the beam waist radius at the second gain crystal $L_2$ change with the incident pump power, and FIG. 3B shows that the beam waist radius at the third gain crystal $L_3$ and the beam waist radius at the fourth gain crystal $L_4$ change with the incident pump power. As can be seen from the figures, in this case, the laser has a resonant cavity with two stable regions, and when the incident pump power increases from 35 W (the maximum pump power of the first stable region) to 68.4 W (the minimum pump power of the second stable region), the generated laser will disappear, that is to say, the incident pump power cannot be converted into the generated laser, and the temperature of the four gain crystals increases rapidly. Therefore, in the adjustment process of transitioning from the first stable region to the second stable region, pump powers injected at the four gain crystals need to be rapidly increased, to achieve the rapid transition.

FIG. 3C (showing $L_1$ and $L_2$) and FIG. 3D (showing $L_3$ and $L_4$) show a trend of the beam waist radii at the center of the gain crystal $L_1$-$L_4$ changing with the increase of the pump powers $P_3$ and $P_4$, when the powers of $P_1$ and $P_2$ both increase to 70 W, 83 W and 90 W. As can be seen, with the increase of the powers of the pump sources $P_1$ and $P_2$, the two stable regions of the laser are getting closer. And, for different powers of $P_1$ and $P_2$, the beam waist radius at the center of the gain crystal $L_1$ and the beam waist radius at the center of the gain crystal $L_2$ are basically the same, and by contrast, the beam waist radius at the center of the gain crystal $L_3$ and the beam waist radius at the center of the gain crystal $L_4$ change significantly.

FIG. 3E (showing $L_1$ and $L_2$) and FIG. 3F (showing $L_3$ and $L_4$) show a trend of the beam waist radii at the center of the gain crystal $L_1$-$L_4$ changing with the increase of the pump powers $P_1$ and $P_2$, when the pump sources $P_3$ and $P_4$ both increase to 90 W, 103 W and 110 W. The results are similar to those in FIG. 3C and FIG. 3D, except that the pump sources $P_1$ and $P_2$ with high pump power provide enough thermal lens effect to ensure that the laser can enter into the stable region, thus at a certain high power, only one stable region appears in the resonant cavity. As can be illustrated from FIG. 3A to FIG. 3F, by changing the pump power injected at each gain crystal, the stable region of the resonant cavity and the beam waist radius at each gain crystal can be easily controlled, to achieve self-mode-matching, and enable the single-frequency laser to obtain a laser output of high power.

Figures 4, 5:
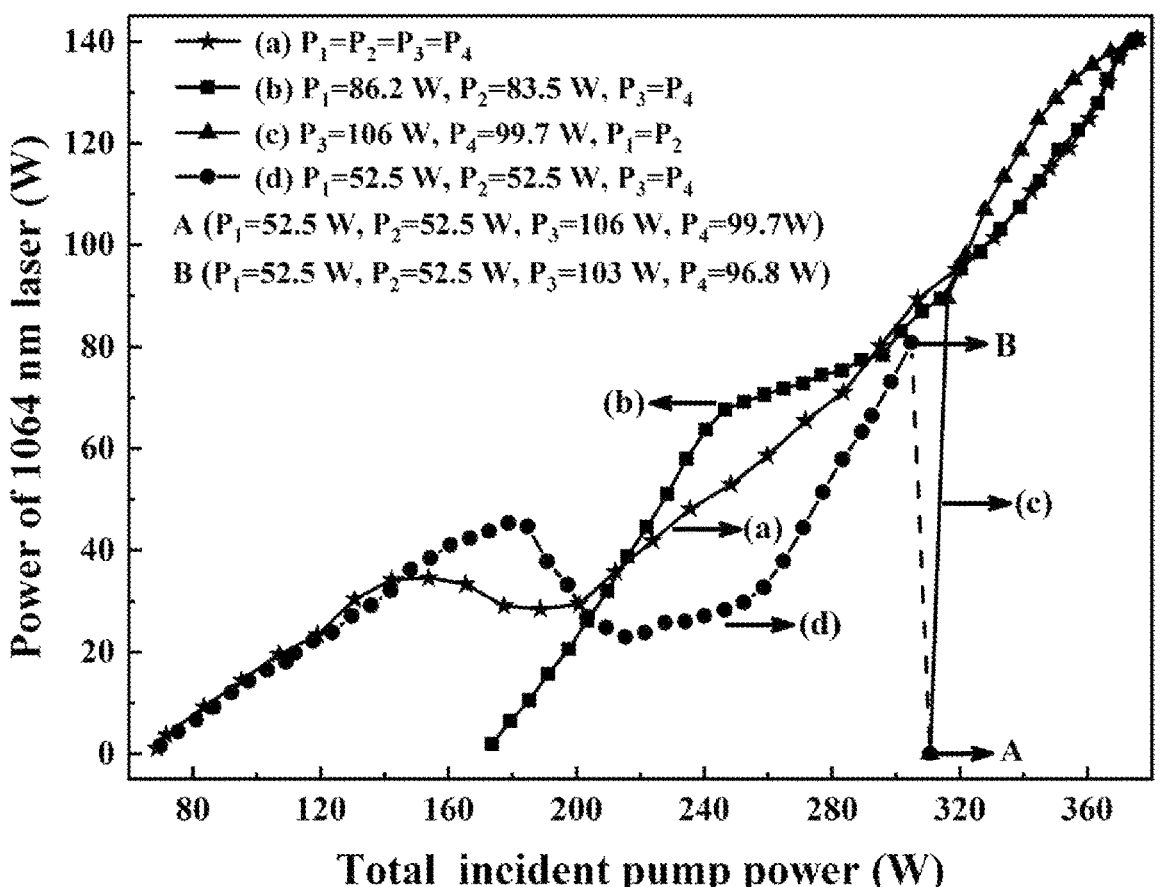
FIG. 4 shows an experimental result of output power of a single-frequency laser in the embodiment shown in FIG. 1.
FIG. 5 shows a structural schematic view of a second embodiment of the all-solid-state single-frequency continuous wave laser according to the present disclosure.

FIG. 4 shows experimental results of the output power of the all-solid-state single-frequency continuous wave laser. According to the calculation results in FIG. 3A-F, by inserting the nonlinear crystal 13 into the beam waist position of the fundamental mode between the cavity mirror 11 and the cavity mirror 12, with a total pump power of 375.4 W ($P_1$=86.2 W, $P_2$=83.5 W, $P_3$=106 W, $P_4$=99.7 W) injected by the pump sources $P_1$-$P_4$, a stable single-frequency 1064 nm laser with a highest output power 140W is obtained. Curve (a) in FIG. 4 shows a power curve of the output power of the single-frequency laser changing with the increase of the total incident pump power, when the powers of the pump sources $P_1$-$P_4$ simultaneously increase. During the recording of the output power, it can be observed that the output power of 1064 nm laser initially increases, with the increase of the total incident pump power up to a value greater than the threshold power of 68.8 W, and then the output power decreases with the increase of the total incident pump power when the total incident pump power is greater than 150 W. Since the incident pump light is converted into heat, the temperature of each crystal rapidly rises. In order to prevent crystal damage caused by large temperature gradient, it is necessary that the total incident pump power increases rapidly from 150 W to 190 W, and once the total incident pump power exceeds 190 W, the output power of 1064 nm laser will increase rapidly. As can be seen from the power output characteristic shown in the curve (a) of FIG. 4, the single-frequency laser of the present disclosure has two stable regions, which are exactly consistent with that of FIG. 3A-F.

The output power curves (b) and (c) in FIG. 4 further validate the dynamic characteristic of the single-frequency laser of the present disclosure. The curve (b) of FIG. 4 shows a change trend of the output power of the 1064 nm laser, when the incident powers of the pump sources $P_3$ and $P_4$ decrease, in a case that the powers of the pump sources $P_1$ and $P_2$ are kept at maximum. The curve (b) of FIG. 4 also shows a double stable region phenomenon similar to that of curve (a) of FIG. 4. However, in the process of the total incident pump optical power decreases from 290 W to 210 W, due to the thermal lens effect of the magneto-optic rotation crystal making up the optical diode, the decrease of the output power of the 1064 nm laser is delayed, and a quasi-double stable region phenomenon appears.

Similar to the curve (b) of FIG. 4, the curve (c) of FIG. 4 shows a change trend of the output power of the 1064 nm laser, when the incident powers of the pump sources $P_1$ and $P_2$ decrease, and in a case that the powers of the pump sources $P_3$ and $P_4$ are kept at maximum. A quasi-double stable region phenomenon can also be observed from the output power characteristics. The curve (c) of FIG. 4 is different from that of curve (b) of FIG. 4 in that the total incident pump power ranges corresponding to the stable regions are different, which indicates that high-power pump sources $P_1$ and $P_2$ can provide enough thermal lens effect to ensure the laser stay in the stable region. When the incident powers of the pump sources $P_1$ and $P_2$ decrease to the power corresponding to point A, that is, when the incident pump powers of the pump sources $P_1$-$P_4$ are decreased to 52.5 W, 52.5 W, 106 W, and 99.7 W, respectively, the resonant cavity has deviated from the stable operation range region, and the generated 1064 nm laser disappears. In the case, by reducing the incident powers of the pump sources $P_3$ and $P_4$ to point B, the 1064 nm laser appears again. In a case that the incident powers of the pump sources $P_1$ and $P_2$ are kept at 52.5 W, the incident powers of the pump sources $P_3$ and $P_4$ are decreased continuously, to obtain a curve (d) of FIG. 4. In curve (d) of FIG. 4, the decrease of the output power similar to that of the curve (a) of FIG. 4 appears, which further validates that the single-frequency laser of the present disclosure has the characteristic of double stable region. Curves (c) and (d) of FIG. 4 also validates that the output characteristics of the single-frequency laser according to present disclosure can be controlled by changing incident pump powers of $P_1$-$P_4$.

It can be seen from the above that different power combination of the pump sources for the gain crystals in the symmetric ring resonant cavity causes different output power of the all-solid-state single-frequency continuous wave laser. If the symmetric ring resonant cavity has two stable operation regions, a stable region jump in the resonant cavity can be achieved by changing the incident pump power within a relatively small range.

Embodiment 2

FIG. 5 shows a structure schematic view of an all-solid-state single-frequency continuous wave laser according to a second embodiment of the present disclosure. The principle of the embodiment is exactly the same with that of the embodiment 1, with a difference that the gain unit has only one gain crystal $L_3$, which is symmetrically arranged between the first gain crystal $L_1$ and the second gain crystal $L_2$, that is, the gain crystal $L_3$ acts as not only the third gain crystal but also the fourth gain crystal. Such a structure allows the resonant cavity to be symmetric.

Embodiment 3

Figure 6:
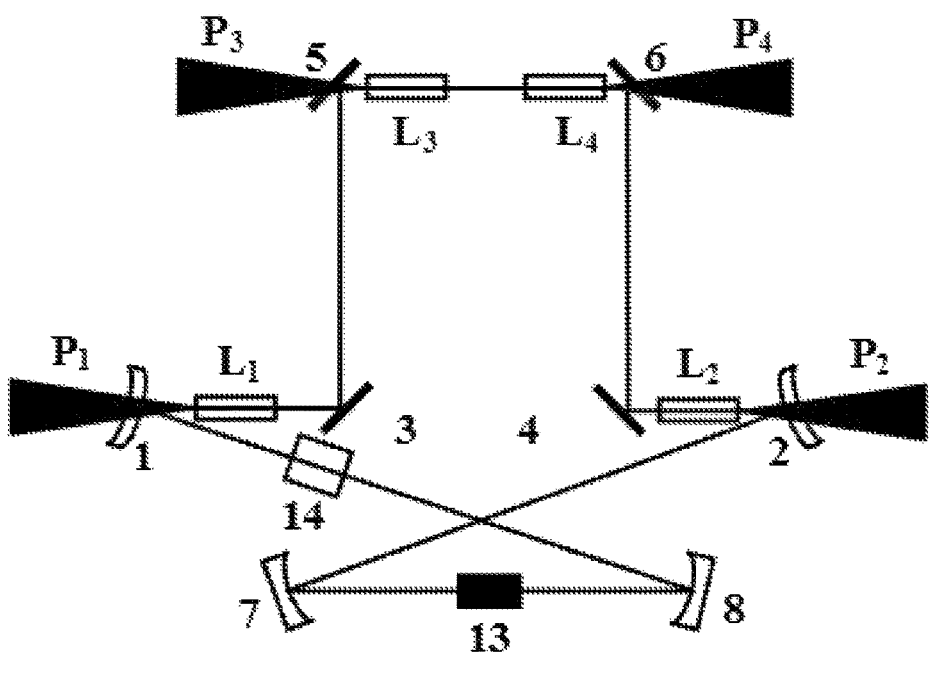
FIG. 6 shows a structural schematic view of a third embodiment of the all-solid-state single-frequency continuous wave laser according to the present disclosure.

FIG. 6 shows a structure schematic view of an all-solid-state single-frequency continuous wave laser according to a third embodiment of the present disclosure. The principle of the embodiment is basically the same as that of the embodiment 1, and a difference therebetween is that there is no plane mirror between the third gain crystal $L_3$ and the fourth gain crystal $L_4$, that is, there is no optical path change between the third gain crystal $L_3$ and the fourth gain crystal $L_4$. Another difference is that the number of the plane mirrors between the first gain crystal $L_1$ and the third gain crystal $L_3$, and the number of the plane mirrors between the second gain crystal $L_2$ and the fourth gain crystal $L_4$ are reduced, thereby reducing the number of changes in the optical path. However, such changes do not affect the symmetry of the resonant cavity, and thus have no effect on the characteristics of the resonant cavity.

Embodiment 4

Figure 7:
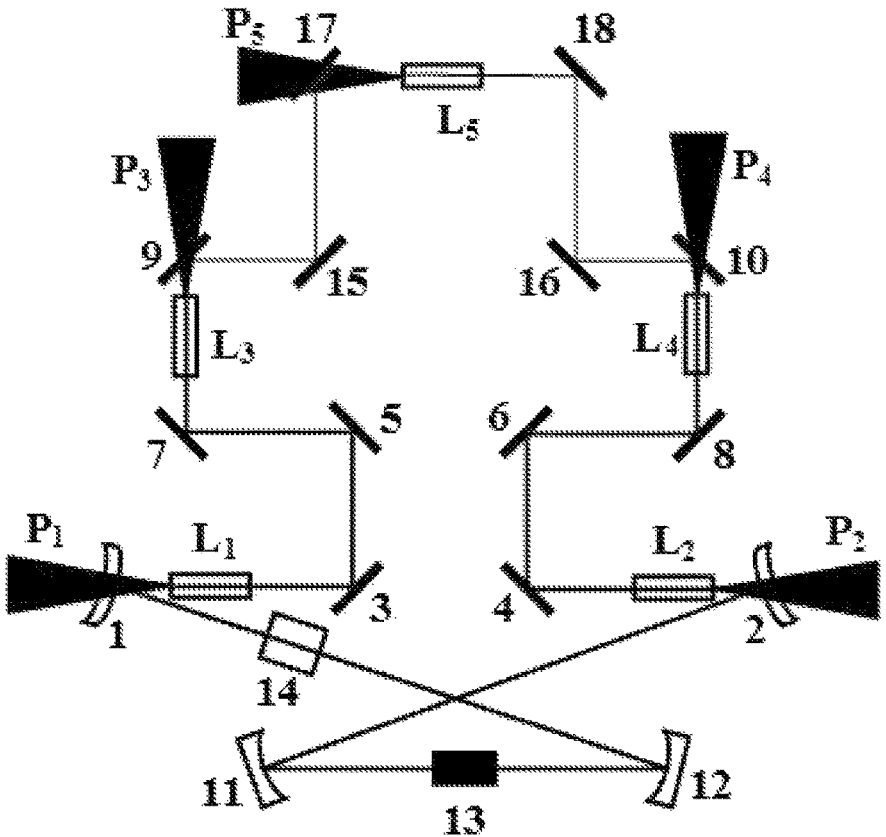
FIG. 7 shows a structural schematic view of a fourth embodiment of the all-solid-state single-frequency continuous wave laser according to the present disclosure.

FIG. 7 shows a structure schematic view of an all-solid-state single-frequency continuous wave laser according to a fourth embodiment of the present disclosure. The principle of the embodiment is basically the same as that of embodiment 1, with a difference that in addition to the third gain crystal $L_3$ and the fourth gain crystal $L_4$, the gain unit also includes a fifth gain crystal $L_5$ located between the third gain crystal $L_3$ and the fourth gain crystal $L_4$, and the fifth gain crystal $L_5$ is also located between the cavity mirrors 9 and 10. Cavity mirrors 17 and 15 for changing the optical path are arranged between the fifth gain crystal $L_5$ and the cavity mirror 9, cavity mirrors 18 and 16 for changing the optical path are arranged between the fifth gain crystal $L_5$ and the cavity mirror 10, the optical path length between the fifth gain crystal $L_5$ and the third gain crystal $L_3$ is equal to the optical path length between the fifth gain crystal $L_5$ and the fourth gain crystal $L_4$, so that the resonant cavity remains symmetrical.

Embodiment 5

Figure 8:
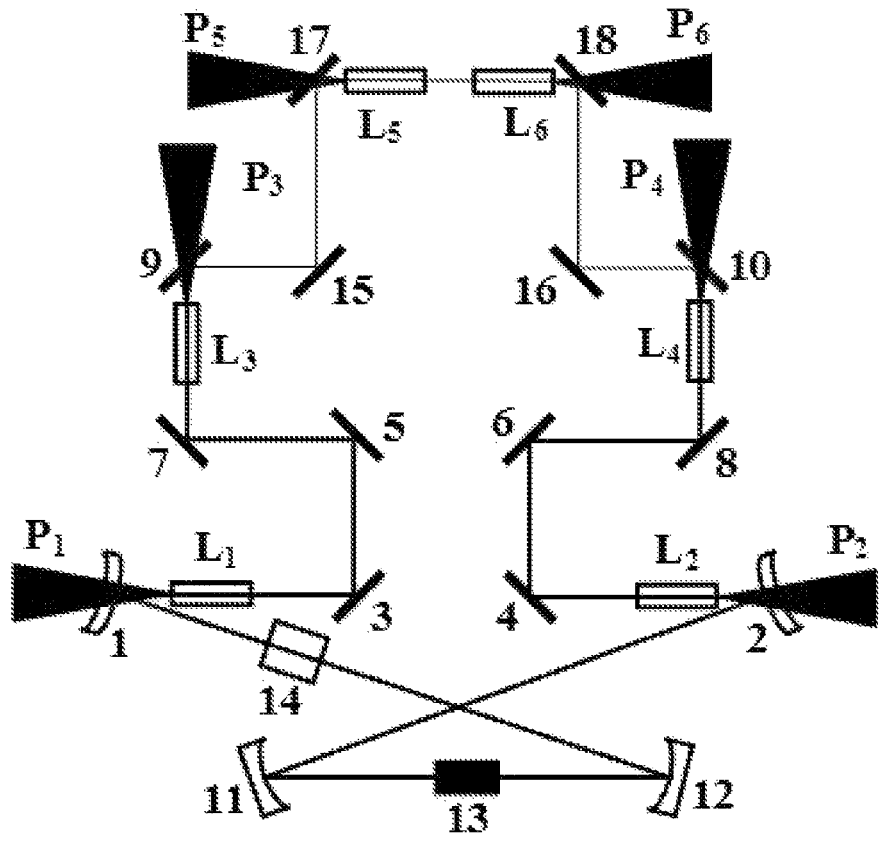
FIG. 8 shows a structural schematic view of a fifth embodiment of the all-solid-state single-frequency continuous wave laser according to the present disclosure.

FIG. 8 shows a structure schematic view of an all-solid-state single-frequency continuous wave laser according to a fifth embodiment of the present disclosure. The principle of the embodiment is basically the same as that of embodiment 1, with a difference that in addition to the third gain crystal $L_3$ and the fourth gain crystal $L_4$, the gain unit also includes a fifth gain crystal $L_5$ and a sixth gain crystal $L_6$ located between the third gain crystal $L_3$ and the fourth gain crystal $L_4$, and the fifth gain crystal $L_5$ and the sixth gain crystal $L_6$ are also located between the cavity mirrors 9 and 10. Cavity mirrors 17 and 15 for changing the optical path are arranged between the fifth gain crystal $L_5$ and the cavity mirror 9, and cavity mirrors 18 and 16 for changing the optical path are arranged between the sixth gain crystal $L_6$ and the cavity mirror 10. The positions of the firth gain crystal $L_5$ and the sixth gain crystal $L_6$ in the symmetric ring resonant cavity are symmetrical, so that the resonant remains symmetrical.

It should be noted that the number of the gain crystals in the present disclosure is not limited, as long as the symmetrical characteristics of the ring resonant cavity are satisfied.

It should be noted that the self-mode-matching dynamic controlling technology of the present disclosure can be used for the high-power all-solid-state single-frequency continuous wave laser with different wavelengths.

The all-solid-state single-frequency continuous wave laser provided by the present disclosure overcomes the problems that the stable region of the resonant cavity is still narrow and the output power of the laser is limited when the imaging system is inserted into the resonant cavity. The gain crystal in the resonant cavity acts as both the gain medium and the mode-matching element with an adjustable focal length. By changing the incident pump power at each gain crystal, the dynamic change of the resonant cavity can be controlled, to achieve a dynamic self-mode-matching of the resonant cavity and a good mode-matching between the pump mode and the cavity mode at each gain crystal.

As used herein, the term "and/or" includes any and all combinations of one or more of the associated listed items. Further, the singular forms and the articles "a", "an", and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening element may be present.

While some specific embodiments of the present disclosure have been described in detail by way of some examples, those skilled in the art should understand that the above examples are merely illustrative, but not intended to limit the scope of the application. Those skilled in the art should understand that modifications can be made to the above embodiments without departing from the scope and spirit of the present application. The scope of the application is defined by the appended claims.

What is claimed is:

1. An all-solid-state single-frequency continuous wave laser, comprising a symmetric ring resonant cavity, a first gain crystal and a second gain crystal symmetrically arranged in the symmetric ring resonant cavity, and a gain unit symmetrically arranged between the first gain crystal and the second gain crystal;

wherein the symmetric ring resonant cavity comprises an output cavity mirror and a first cavity mirror arranged symmetrically to the output cavity mirror, and a second cavity mirror at a front end of the first gain crystal, the output cavity mirror, the first cavity mirror and a third cavity mirror at a front end of the second gain crystal form a 8-shaped optical path;

wherein the gain unit comprises at least one gain crystal arranged in sequence, and in the gain unit, a third gain crystal nearest to the first gain crystal and a fourth gain crystal nearest to the second gain crystal are symmetrically arranged;

wherein each gain crystal is coupled with a separate pump source, an optical diode is arranged between the second cavity mirror and the output cavity mirror, and a nonlinear crystal is arranged at a beam waist between the first cavity mirror and the output cavity mirror;

wherein two gain crystals symmetrically arranged are the same, and each gain crystal acts as a gain medium and a mode-matching element.

2. The all-solid-state single-frequency continuous wave laser according to claim 1, wherein the third gain crystal and the fourth gain crystal are same crystal.

3. The all-solid-state single-frequency continuous wave laser according to claim 1, wherein the gain unit comprises the third gain crystal, the fourth gain crystal, and at least one fifth gain crystal which is symmetrically located between the third gain crystal and the fourth gain crystal.

4. The all-solid-state single-frequency continuous wave laser according to claim 1, wherein the pump source is a fiber coupled laser diode.

5. The all-solid-state single-frequency continuous wave laser according to claim 1, wherein the second cavity mirror and the third cavity mirror are concave-convex lenses with an incidence angle of 10 degrees.

6. The all-solid-state single-frequency continuous wave laser according to claim 5, wherein a first number of plane mirrors with an incidence angle of 45 degrees are arranged between the first gain crystal and the third gain crystal, and the first number of the plane mirrors with the incidence angle of 45 degrees are arranged between the second gain crystal and the fourth gain crystal.

7. The all-solid-state single-frequency continuous wave laser according to claim 6, wherein the output cavity mirror and the first cavity mirror are plano-concave mirrors with an incidence angle of 10 degrees, a flat face of the first cavity mirror is coated with a high transmission film for fundamental frequency light and a high transmission film for frequency-doubled light, a concave face of the first cavity mirror is coated with a high-reflection film for fundamental frequency light and the high transmission film for frequency-doubled light, a flat face of the output cavity mirror is coated with the high transmission film for fundamental frequency light and the high transmission film for frequency-doubled light, and a concave face of the output cavity mirror is coated with the high transmission film for frequency-doubled light and a transmission film with a predetermined transmissivity for a fundamental frequency light.

8. The all-solid-state single-frequency continuous wave laser according to claim 1, wherein for a different power combination of the pump sources for the gain crystals in the symmetric ring resonant cavity, the output power of the all-solid-state single-frequency continuous wave laser is different.

9. The all-solid-state single-frequency continuous wave laser according to claim 1, wherein for the resonant cavity a pumping method of end pumping or side pumping is adopted.

10. The all-solid-state single-frequency continuous wave laser according to claim 1, wherein the gain medium in the symmetric ring resonant cavity comprises one or more of a slab gain medium, a bulk gain medium, a rod gain medium and a single crystal optical fiber gain medium.

* * * * *